(12) United States Patent
Tsumiyama et al.

(10) Patent No.: US 8,464,827 B2
(45) Date of Patent: Jun. 18, 2013

(54) UTILITY VEHICLE

(75) Inventors: Yoshinori Tsumiyama, Lincoln, NE (US); Teruaki Yamamoto, Lincoln, NE (US); Brian Butler, Gretna, NE (US)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 169 days.

(21) Appl. No.: 12/980,205

(22) Filed: Dec. 28, 2010

(65) Prior Publication Data
US 2012/0160592 A1 Jun. 28, 2012

(51) Int. Cl.
*B62D 21/02* (2006.01)

(52) U.S. Cl.
USPC ............... 180/311; 296/187.01; 296/187.08; 296/193.07; 296/203.01; 296/190.08

(58) Field of Classification Search
USPC ............... 180/311, 312; 296/187.01, 187.08, 296/193.07, 203.01, 204, 205, 190.08; 403/378, 403/379.1, 379.3
See application file for complete search history.

(56) References Cited

U.S. PATENT DOCUMENTS

| | | | | |
|---|---|---|---|---|
| 1,201,703 A * | 10/1916 | Davidson | ...................... | 108/108 |
| 1,658,264 A * | 2/1928 | Sutton et al. | .............. | 166/241.2 |
| 3,292,969 A * | 12/1966 | Eggert, Jr. | ..................... | 296/205 |
| 4,735,275 A * | 4/1988 | Tsukahara et al. | ............ | 180/215 |
| 4,798,400 A * | 1/1989 | Kosuge | ......................... | 280/796 |
| 5,327,989 A * | 7/1994 | Furuhashi et al. | ............ | 180/248 |
| 5,660,428 A * | 8/1997 | Catlin | ........................... | 296/205 |
| 5,855,250 A * | 1/1999 | Nishi | ............................ | 180/312 |
| 6,183,167 B1 * | 2/2001 | Ruiz et al. | ..................... | 405/251 |
| 6,336,580 B1 * | 1/2002 | Allen et al. | .................... | 224/532 |
| 6,357,769 B1 * | 3/2002 | Omundson et al. | .... | 280/124.109 |
| 6,799,781 B2 * | 10/2004 | Rasidescu et al. | ............ | 280/781 |
| 7,422,082 B2 * | 9/2008 | Reffitt | ......................... | 180/90.6 |
| 7,650,959 B2 * | 1/2010 | Kato et al. | ..................... | 180/312 |
| 7,677,343 B2 * | 3/2010 | Kitai et al. | ................. | 180/89.17 |
| 7,735,903 B2 * | 6/2010 | Yamamura et al. | ...... | 296/187.12 |
| 7,819,220 B2 * | 10/2010 | Sunsdahl et al. | ............. | 180/312 |
| 7,874,605 B2 * | 1/2011 | Smith et al. | ..................... | 296/64 |
| 7,874,606 B2 * | 1/2011 | Yamamura et al. | ............ | 296/64 |
| 7,926,862 B2 * | 4/2011 | Smith et al. | ..................... | 296/64 |
| 7,938,593 B1 * | 5/2011 | Young | ........................... | 403/297 |
| 7,967,100 B2 * | 6/2011 | Cover et al. | ................... | 180/312 |
| 8,051,935 B2 * | 11/2011 | Clapp | ........................... | 180/117 |
| 2002/0011374 A1 * | 1/2002 | Brister | ......................... | 180/291 |
| 2006/0186699 A1 * | 8/2006 | Davis et al. | .................. | 296/187.01 |
| 2008/0023240 A1 * | 1/2008 | Sunsdahl et al. | ............. | 180/68.2 |
| 2008/0023249 A1 * | 1/2008 | Sunsdahl et al. | ............. | 180/312 |
| 2008/0053738 A1 * | 3/2008 | Kosuge et al. | ................ | 180/311 |
| 2008/0100098 A1 * | 5/2008 | Kobayashi et al. | ........... | 296/204 |
| 2009/0178871 A1 * | 7/2009 | Sunsdahl et al. | ............. | 180/233 |
| 2009/0183938 A1 * | 7/2009 | Cover et al. | .................. | 180/291 |
| 2009/0194985 A1 * | 8/2009 | McGuire | ...................... | 280/785 |
| 2010/0314191 A1 * | 12/2010 | Deckard et al. | ............... | 180/312 |
| 2011/0024221 A1 * | 2/2011 | Murray | ......................... | 180/312 |
| 2012/0098300 A1 * | 4/2012 | Murray | ......................... | 296/205 |

FOREIGN PATENT DOCUMENTS

| | | | |
|---|---|---|---|
| JP | 02293275 A | * | 12/1990 |
| JP | 03109130 A | * | 5/1991 |
| JP | 05310168 A | * | 11/1993 |
| JP | 2007-276703 A | | 10/2007 |

* cited by examiner

*Primary Examiner* — Nicole Verley
(74) *Attorney, Agent, or Firm* — Alleman Hall McCoy Russell & Tuttle LLP (57) ABSTRACT

A utility vehicle includes a vehicle body frame including a main frame to which an engine is mounted, the main frame including a round pipe having a circular cross-section and a rectangular pipe having a rectangular cross-section.

5 Claims, 11 Drawing Sheets

Fig.13

UTILITY VEHICLE

BACKGROUND OF THE INVENTION

1. Field of the Invention

The present invention relates to a utility vehicle including a vehicle body frame including a main frame to which an engine is mounted.

2. Description of the Related Art

Japanese Laid-Open Patent Application Publication No. 2007-276703 discloses an exemplary conventional utility vehicle. In this utility vehicle, an engine is mounted to a main frame constituting a vehicle body frame, and a seat on which a passenger can be seated is fastened to a part of the main frame. In the utility vehicle, the main frame is entirely constructed of rectangular pipes with rectangular cross-sections. Therefore, the main frame has a high stiffness against an engine load applied to the main frame in a vertical direction or an external load applied to the main frame in a forward and rearward direction. This makes it possible to prevent the main frame from being deformed by the engine load, the external load, etc.

Round pipes with circular cross-sections are used for a cabin frame (ROPS), but not for the main frame. For this reason, in a state where the cabin frame (ROPS) is detached, curved lines of the round pipes do not appear in an external shape of the utility vehicle, and the external design appearance is undesirable. Therefore, there is a need for improvement of external design appearance of the utility vehicle in a state where the cabin frame (ROPS) is detached, while maintaining a high stiffness of the main frame in the vertical direction and in the forward and rearward direction.

SUMMARY OF THE INVENTION

A utility vehicle of the present invention comprises a vehicle body frame including a main frame to which an engine is mounted, the main frame including a round pipe having a circular cross-section and a rectangular pipe having a rectangular cross-section.

In such a configuration, stiffness of the main frame in directions substantially parallel to walls of the rectangular pipe can be enhanced in a portion of the main frame constructed of the rectangular pipe. In addition, a portion of the main frame constructed of the round pipe can be bent easily in all directions. As a result, an external design appearance of the main frame can be improved.

The above and further objects and features of the invention will more fully be apparent from the following detailed description with accompanying drawings.

DETAILED DESCRIPTION OF THE PREFERRED EMBODIMENTS

Hereinafter, an embodiment of the present invention will be described with reference to the drawings. The stated directions are referenced from the perspective of a driver riding in a utility vehicle. It is assumed that the utility vehicle is in a stopped state on a road surface substantially parallel to a horizontal plane.

Figure 1:
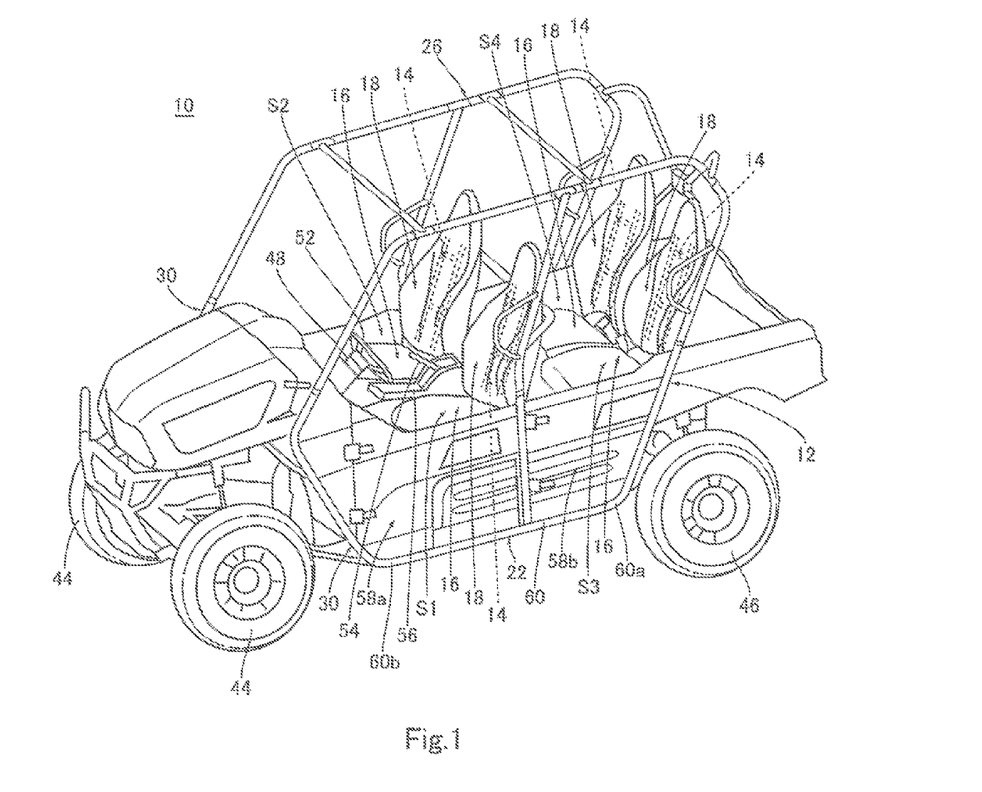
FIG. 1 is a perspective view showing an external appearance of a utility vehicle according to an embodiment.
Figure 2:
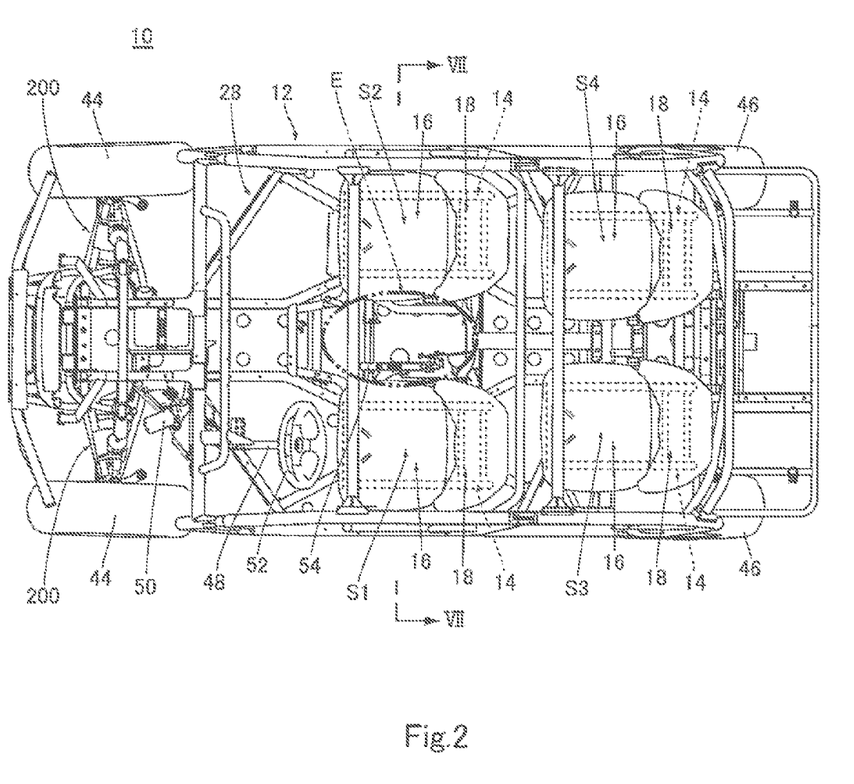
FIG. 2 is a plan view showing a construction of the utility vehicle according to the embodiment.
Figure 3:
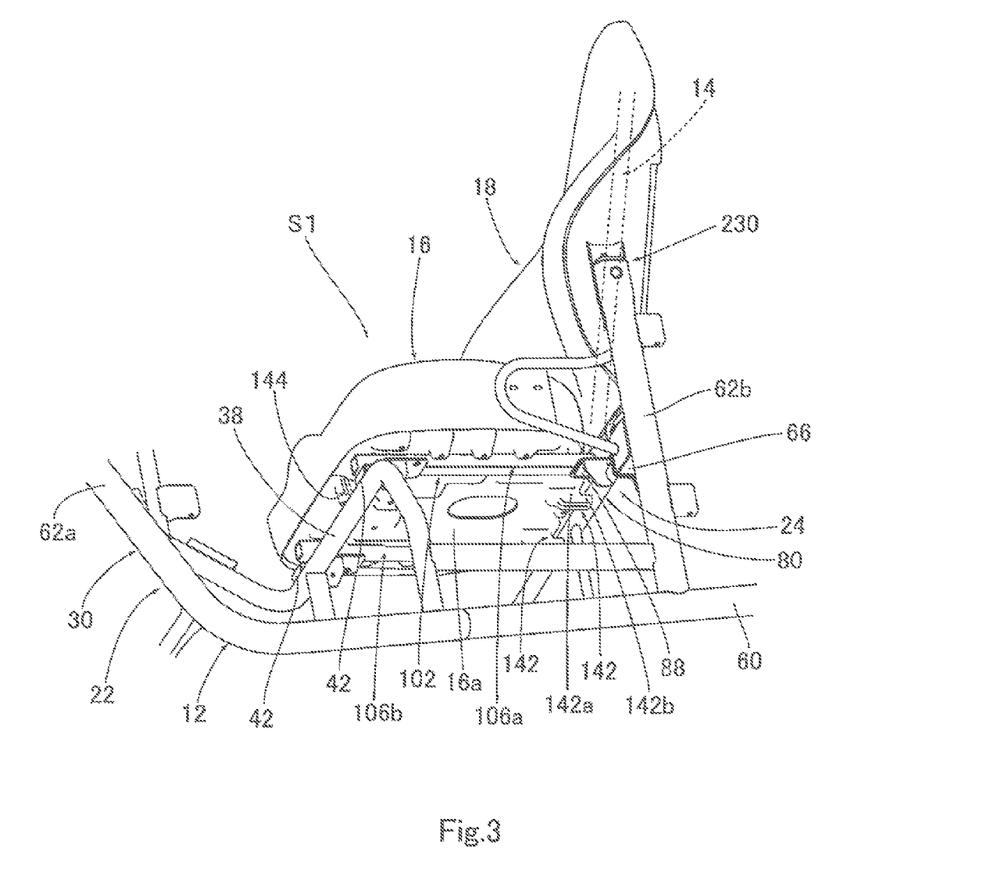
FIG. 3 is a perspective view showing a state where a seat is mounted to a vehicle body frame, as viewed from obliquely downward.

FIG. 1 is a perspective view showing an external appearance of a utility vehicle 10 according to an embodiment. FIG. 2 is a plan view showing a configuration of the utility vehicle 10. FIG. 3 is a perspective view showing a state where a seat S1 is mounted to a vehicle body frame 12, as viewed from obliquely downward.

As shown in FIGS. 1 to 3, the utility vehicle 10 includes the vehicle body frame 12, four seat frames 14 mounted to the vehicle body frame 12, seat bottoms 16 mounted to the four seat frames 14, respectively, and seat backrests 18 mounted to the four seat frames 14, respectively. Each of the four independent seats S1 to S4 includes the seat frame 14, the seat bottom 16 and the seat backrest 18. In this embodiment, the seats S1 and S2 at the front side are arranged side by side in a rightward and leftward direction, and the seats S3 and S4 are arranged side by side in the rightward and leftward direction, behind the seats S1 and S2, respectively. The seat S1 located at the front side and at the left side is a driver seat.

Figure 4:
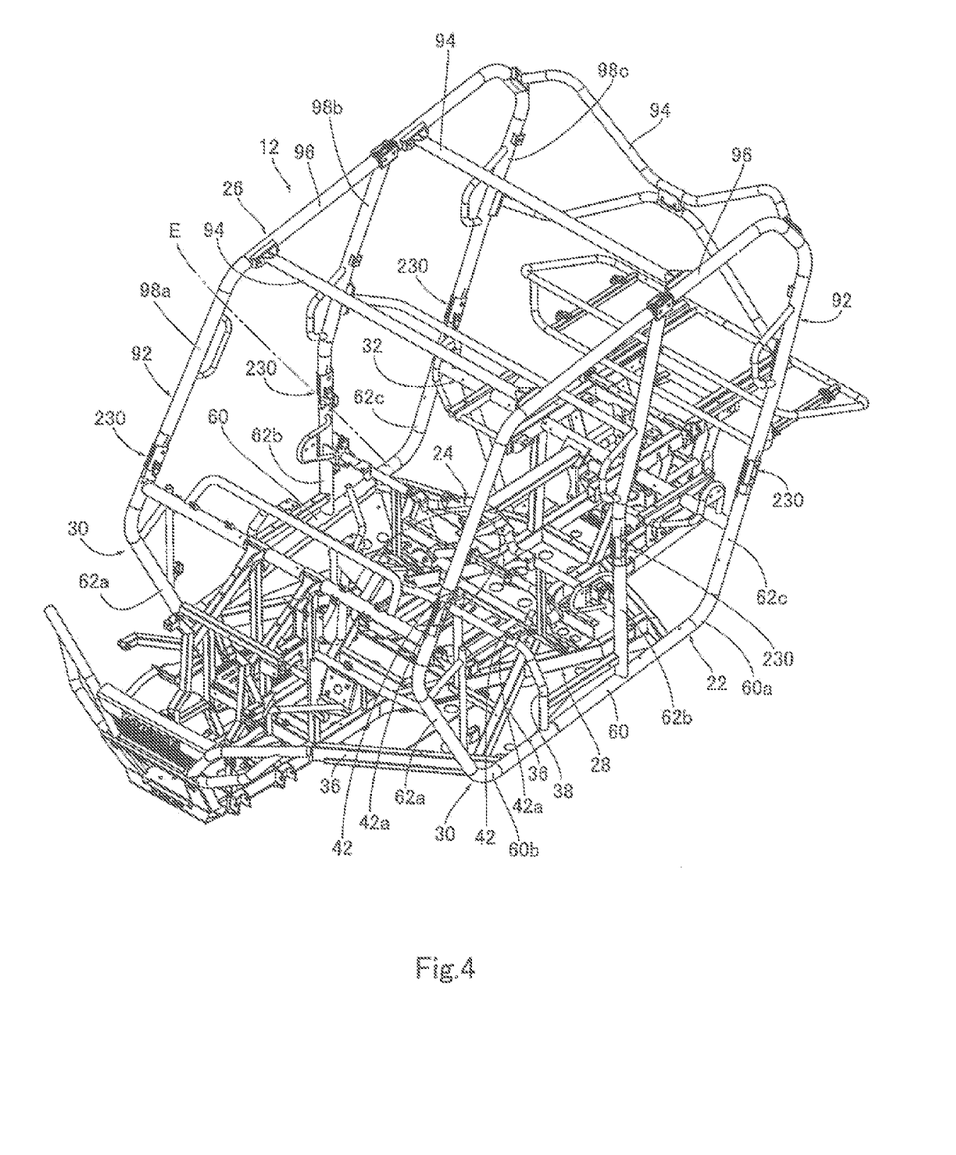
FIG. 4 is a perspective view showing a configuration of the vehicle body frame.
Figure 5:
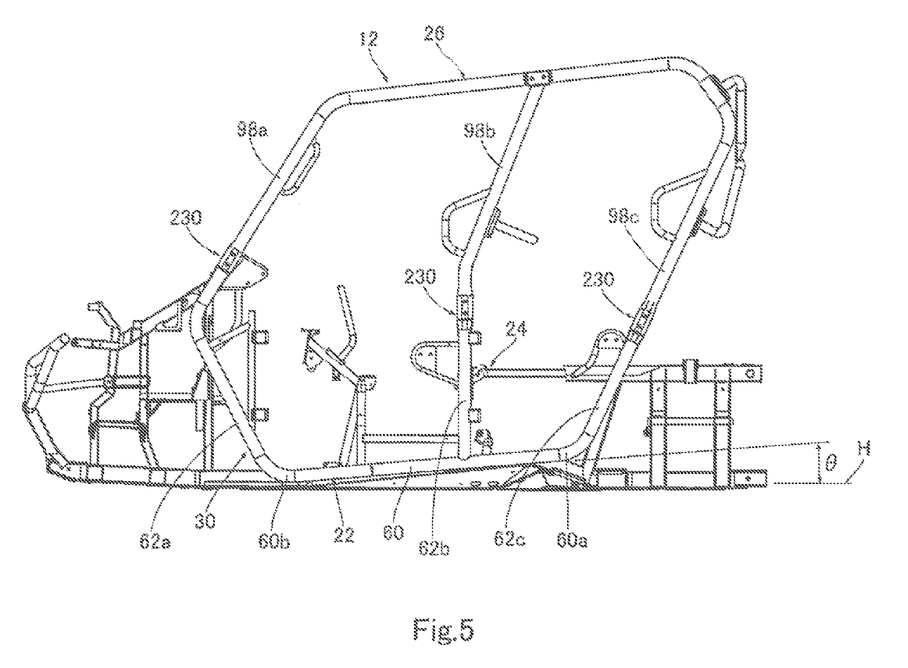
FIG. 5 is a left side view showing a configuration of the vehicle body frame.
Figure 6:
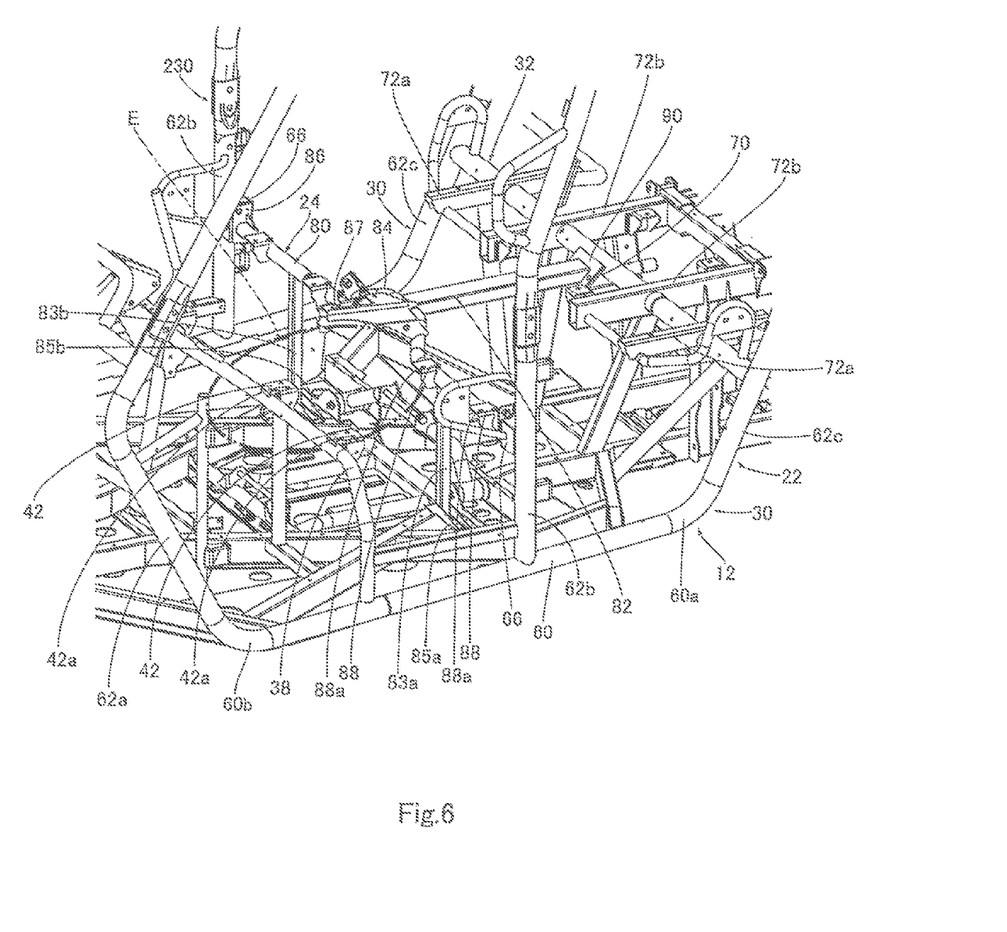
FIG. 6 is a perspective view showing a configuration of a part of the vehicle body frame.
Figure 7:
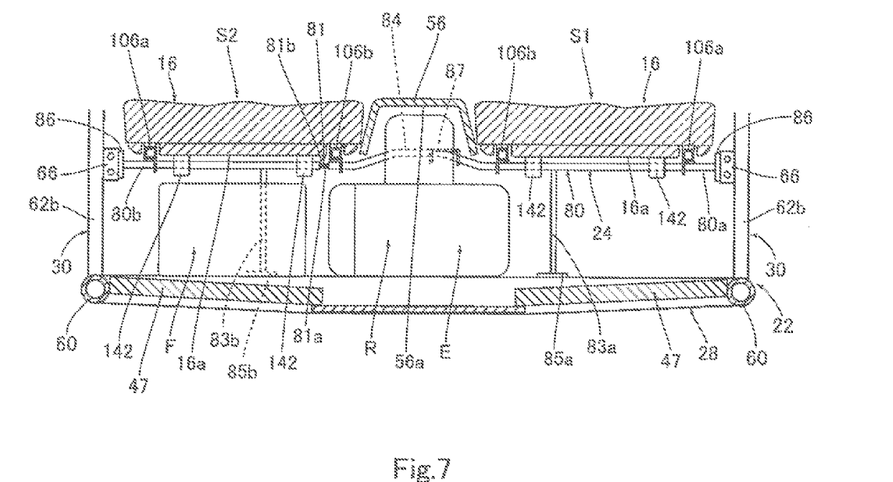
FIG. 7 is a cross-sectional view taken along line VII-VII of FIG. 2.

FIG. 4 is a perspective view showing a configuration of the vehicle body frame 12. FIG. 5 is a left side view showing a configuration of the vehicle body frame 12. FIG. 6 is a perspective view showing a configuration of a part of the vehicle body frame 12. FIG. 7 is a cross-sectional view taken along line VII-VII of FIG. 2. As shown in FIGS. 4 and 5, the vehicle body frame 12 includes a main frame 22, a sub-frame 24 for reinforcing the main frame 22, and a cabin frame (ROPS) 26.

As shown in FIG. 4, the main frame 22 includes a floor member 28 which is opposite to the road surface, a pair of side members 30 which are provided at side portions of the vehicle body in the rightward and leftward direction, and a cross member 32 for coupling the side members 30 to each other.

As shown in FIG. 2, the floor member 28 is a base member for supporting the engine E and the four seats S1 to S4. As shown in FIG. 4, the floor member 28 is constructed in such a manner that a plurality of rectangular pipes 36 extending horizontally are welded to each other to form a unitary structure. Each of the rectangular pipes 36 has a rectangular cross-section, in which a vertical length is greater than a horizontal length (i.e., lateral width). This increases a stiffness of the floor member 28 with respect to a force applied to the floor member 28 in the vertical direction while lessening a total area of an upper surface and a lower surface of the floor member 28.

As shown in FIG. 4, at a portion of an upper surface of the floor member 28, corresponding to a front end portion of each of the seats S1 and S2 (FIG. 2), a substantially arch-shaped support pipe 38 is disposed to extend in the rightward and leftward direction and is configured to support the seat frame 14 (FIG. 2). Each support pipe 38 is provided with two plates 42 arranged to be spaced apart from each other in the rightward and leftward direction. The plates 42 have holes 42a into which bolts 40 (FIG. 13) are inserted, respectively. As shown in FIG. 2, at side portions of a front portion of the floor member 28 in the rightward and leftward direction, suspension systems 200 are provided. Front wheels 44 are attached to tip end portions of the suspension systems 200, respectively. In addition, at side portions of a rear portion of the floor member 28 in the rightward and leftward direction, suspension systems (not shown) are provided. Rear wheels 46 are attached to the suspension systems, respectively.

As shown in FIG. 7, the engine E is mounted to a center portion of the floor member 28. Plates 47, made of a metal such as a ferrous metal, are provided at lower surfaces of side portions of the floor member 28 in the rightward and leftward direction. A fuel tank F is disposed above the plate 47 at one side (in this embodiment, right side) of the engine E in the rightward and leftward direction. As shown in FIG. 2, the four seats S1 to S4 are arranged above the floor member 28 at right and left sides and at front and rear sides. A steering shaft 48 is provided forward relative to the seat S1. An electric power steering device 50 is coupled to a lower end portion of the steering shaft 48. A handle 52 is coupled to an upper end portion of the steering shaft 48. As shown in FIG. 1, a lever 54 of a parking brake and a console box 56 are provided at a right side of the seat S1.

Figure 8:
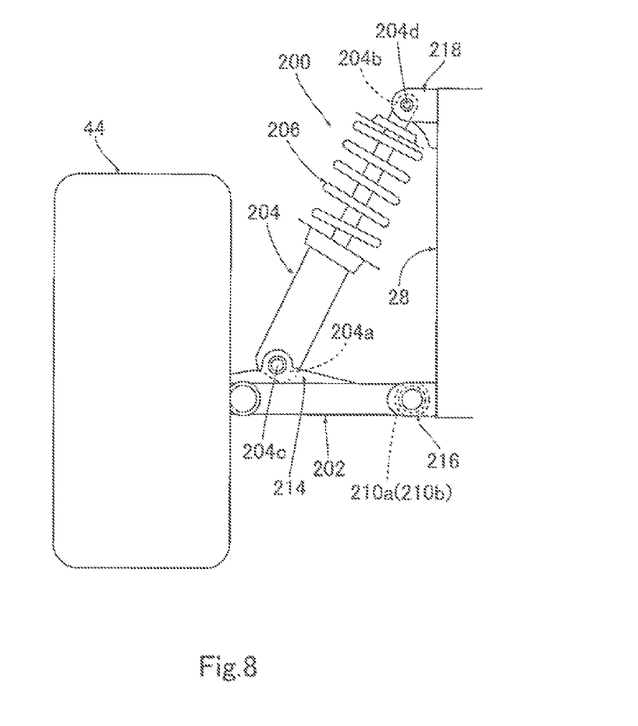
FIG. 8 is a view showing a configuration of a suspension system as viewed from behind.
Figure 9:
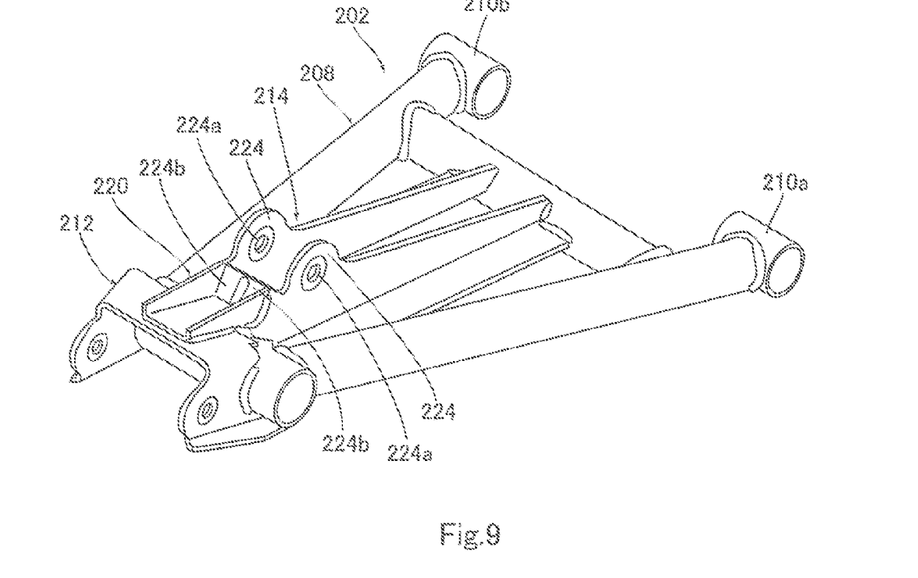
FIG. 9 is a perspective view showing a configuration of a damper mounting structure for supporting a lower end portion of the damper member.
Figure 10:
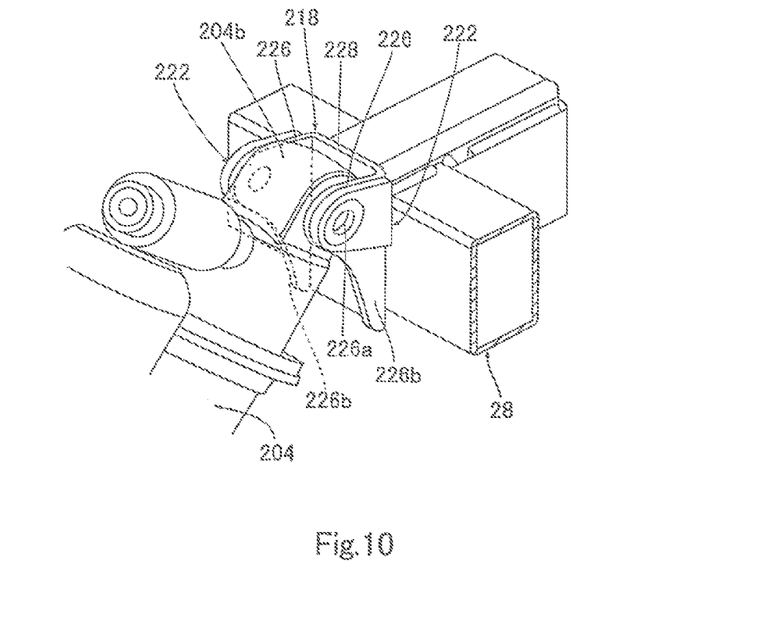
FIG. 10 is a perspective view showing a configuration of a second mounting structure for supporting an upper end portion of the damper member.

FIG. 8 is a view showing a configuration of the suspension system 200 for supporting the front wheel 44 (FIG. 1) as viewed from behind. FIG. 9 is a perspective view showing a configuration of a damper mounting structure 214 for supporting a lower end portion of the damper member 204 (FIG. 8). FIG. 10 is a perspective view showing a configuration of a second mounting structure 218 for supporting an upper end portion 204b of the damper member 204. As shown in FIG. 8, the suspension system 200 serves to absorb an impact and a vibration transferred from the road surface to the front wheel 44, and includes an arm member 202 for supporting the front wheel 44, the damper member 204 coupled to the arm member 202 and a coil spring 206 mounted to the damper member 204.

As shown in FIG. 9, the arm member 202 includes a body 208 having a substantially A-shape, two first connecting portions 210a and 210b of a substantially cylindrical shape which are provided at a base end portion of the body 208, a wheel mounting portion 212 provided at a tip end portion of the body 208, and the damper mounting structure 214 provided at a center portion of the body 208. As shown in FIG. 8, the first connecting portions 210a and 210b of the arm member 202 are rotatably mounted to the two first mounting portions 216 provided at the floor member 28, respectively such that the arm member 202 is rotatable. As shown in FIG. 8, a lower end portion 204a of the damper member 204 is rotatably mounted to the damper mounting structure 214 of the arm member 202 such that the damper member 204 is rotatable, while an upper end portion 204b of the damper member 204 is mounted to the second mounting structure 218 provided at the floor member 28, such that the damper member 204 is rotatable.

When the damper mounting structure 214 and the second mounting structure 218 are deformed, the damper member 204 operates unstably, causing a problem that the suspension system 200 cannot absorb an impact effectively, for example. To solve this, in this embodiment, as shown in FIG. 9, a stiffness of the damper mounting structure 214 is enhanced by a reinforcement member 220 of a substantially-U shape. As shown in FIG. 10, a stiffness of the second mounting structure 218 is enhanced by two plate-shaped reinforcement members 222.

As shown in FIG. 9, the damper mounting structure 214 includes two plate-shaped bearings 224 for supporting a pivot 204c (FIG. 8) provided at the lower end portion (FIG. 8) of the damper member 204 (FIG. 8). The two bearings 224 are arranged substantially in parallel with each other to be spaced apart from each other. Each of the two bearings 224 has a hole 224a into which the pivot 204c (FIG. 8) is inserted. Tip end portions 224b of the two bearings 224 are bent to be closer to each other and are welded to each other. As shown in FIG. 9, the reinforcement member 220 has a substantially U-shape formed by bending a plate material made of metal such as a ferrous metal. An end surface of a substantially U-shape of the reinforcement member 220 is welded to the tip end portions 224b of the two bearings 224, while a bottom portion of the reinforcement member 220 is welded to the arm member 202 and to the wheel mounting portion 212.

As shown in FIG. 10, the second mounting structure 218 has a substantially U-shape formed by bending a plate material made of metal such as a ferrous metal, and two plate-shaped bearings 226 for supporting a pivot 204d (FIG. 8) provided at an upper end portion 204b (FIG. 8) of the damper member (FIG. 8). The two bearings 226 are arranged substantially in parallel with each other to be spaced apart from each other. Each of the two bearings 226 has a hole 226a into which the pivot 204d (FIG. 8) is inserted. Lower portions 226b of the bearings 226 extend downward, thereby enhancing a stiffness of the bearings 226. As shown in FIG. 10, each of the two reinforcement members 222 has the same shape as a portion of the bearing 226 except for a lower portion 226b and is integrally welded to a side surface of the bearing 226.

As shown in FIG. 1, each side member 30 is configured to support the cabin frame (ROPS) 26, a front door 58a and a rear door 58b. As shown in FIG. 4, the side member 30 includes a side pipe element 60 extending in the forward and rearward direction at a side portion of the floor member 28 in the rightward and leftward direction, a first lower pillar pipe element 62a extending upward from a front end portion of the side pipe element 60, a second lower pillar pipe element 62b extending upward from a center portion of the side pipe element 60 in the forward and rearward direction, and a third lower pillar pipe element 62c extending upward from a rear end portion of the side pipe element 60. The side pipe element 60 and the lower pillar pipe elements 62a to 62c are round pipes having circular cross-sections. The side pipe element 60 is welded to the rectangular pipe 36 of the floor member 28 at side portion in the rightward and leftward direction.

As shown in FIG. 5, in this embodiment, bottom portions of the main frame 22 are constituted by the side pipe elements 60 at both side portions of the main frame 22 in the rightward and leftward direction. To prevent a rear end 60a of each side pipe element 60 from contacting the road surface when the utility vehicle 10 is driving on a slope, the side pipe element 60 is tilted at a predetermined angle θ with respect to a horizontal plane H, such that its height increases from a tip end 60b toward a rear end 60a.

As shown in FIG. 3, lower portions of coupling structures 230 (FIG. 11, FIG. 12) are provided at upper end portions of the lower pillar pipe elements 62a to 62c, respectively. As shown in FIG. 6, connecting portions 66 for coupling the sub-frame 24 are provided at vertical center portions of the second lower pillar pipe elements 62b, respectively.

As shown in FIG. 6, the cross member 32 is a pipe member for coupling third lower pillar pipe elements 62c of the pair of right and left side members 30. One end portion of the cross member 32 is welded to one of the third lower pillar pipe elements 62c, while an opposite end portion thereof is coupled to the other of the third lower pillar pipe elements 62c. The cross member 32 is provided with a connecting portion 70, at a center portion thereof in a longitudinal direction of the cross member 32. Two support pipes 72a and 72b extending in the forward and rearward direction are provided at portions of the cross member 32 respectively corresponding to the seats S3 and S4 (FIG. 2), to support the seat frame 14 (FIG. 2).

As shown in FIG. 6, the sub-frame 24 includes a cross member 80 extending in the rightward and leftward direction, a longitudinal member 82 provided behind the cross member 80 to extend in the forward and rearward direction, and two leg elements 83a and 83b for supporting the cross member 80.

As shown in FIG. 6, the cross member 80 is a pipe member for coupling the second lower pillar pipe elements 62b of the right and left side members 30 behind the seat bottom 16 (FIG. 2). As shown in FIG. 7, the cross member 80 includes a first pipe element 80a, a second pipe element 80b, and a joint 81 for coupling the first pipe element 80a to the second pipe element 80b. The joint 81 includes a first connecting portion 81a provided at an end portion of the first pipe element 80a, a second connecting portion 81b provided at an end portion of the second pipe element 80b, and a bolt and a nut (not shown) for fastening the first connecting portion 81a to the second connecting portion 81b.

As shown in FIG. 7, the cross member 80 has a bent portion 84 at a center portion (in this embodiment, a portion of the first pipe element 80a, the same occurs hereinafter) in the longitudinal direction such that the bent portion 84 is bent upward in an obliquely rearward direction to avoid interference with the engine E. Connecting portions 86 are provided at both ends of the cross member 80, respectively, in the longitudinal direction. The connecting portions 86 are coupled to the connecting portions 66 of the main frame 22, respectively, by bolts and the like. A bracket 87 is welded to a longitudinal center portion of the cross member 80 to support the lever 54 (FIG. 2). As shown in FIG. 6, two plates 88 are welded to portions of the cross member 80, respectively corresponding to rear end portions of the seats S1 and S2, such that the two plates 88 are arranged to be spaced apart from each other in the rightward and leftward direction. The plates 88 have threaded holes 88a into which bolts 40 (FIG. 13) are threadingly engaged.

As shown in FIG. 6, the longitudinal member 82 is a pipe member for coupling the cross member 80 to the cross member 32 of the main frame 22. A front end portion of the longitudinal member 82 is welded to the bent portion 84, and a connecting portion 90 is provided at a rear end portion of the longitudinal member 82. The connecting portion 90 is connected to the connecting portion 70 of the cross member 32 by bolts and the like.

As shown in FIG. 7, the leg elements 83a and 83b are rod-like elements for supporting the cross member 80. An upper end portion of the leg element 83a is welded to the first pipe element 80a of the cross member 80, while an upper end portion of the leg element 83b is welded to the second pipe element 80b of the cross member 80. Connecting portions 85a and 85b are provided at lower end portions of the leg elements 83a and 83b, respectively. The connecting portions 85a and 85b are connected to the upper surface of the floor member 28 by bolts and the like.

As shown in FIG. 4, the cabin frame (ROPS) 26 includes a pair of right and left side members 92 coupled to the pair of right and left side members 30, respectively, and a plurality of cross members 94 for coupling the side members 92 to each other. Each side member 92 includes a side pipe element 96 positioned opposite to the side pipe element 60 of the main frame 22, a first upper pillar pipe element 98a extending downward from a front end portion of the side pipe element 96, a second upper pillar pipe element 98b extending downward from a center portion of the side pipe element 96 in the forward and rearward direction, and a third upper pillar pipe element 98c extending downward from a rear end portion of the side pipe element 96. The side pipe elements 96 and the upper pillar pipe elements 98a to 98c are round pipes having circular cross-sections. Upper portions of coupling structures 230 (FIG. 11, FIG. 12) are provided at lower end portions of the upper pillar pipe elements 98a to 98c, respectively.

Figure 11:
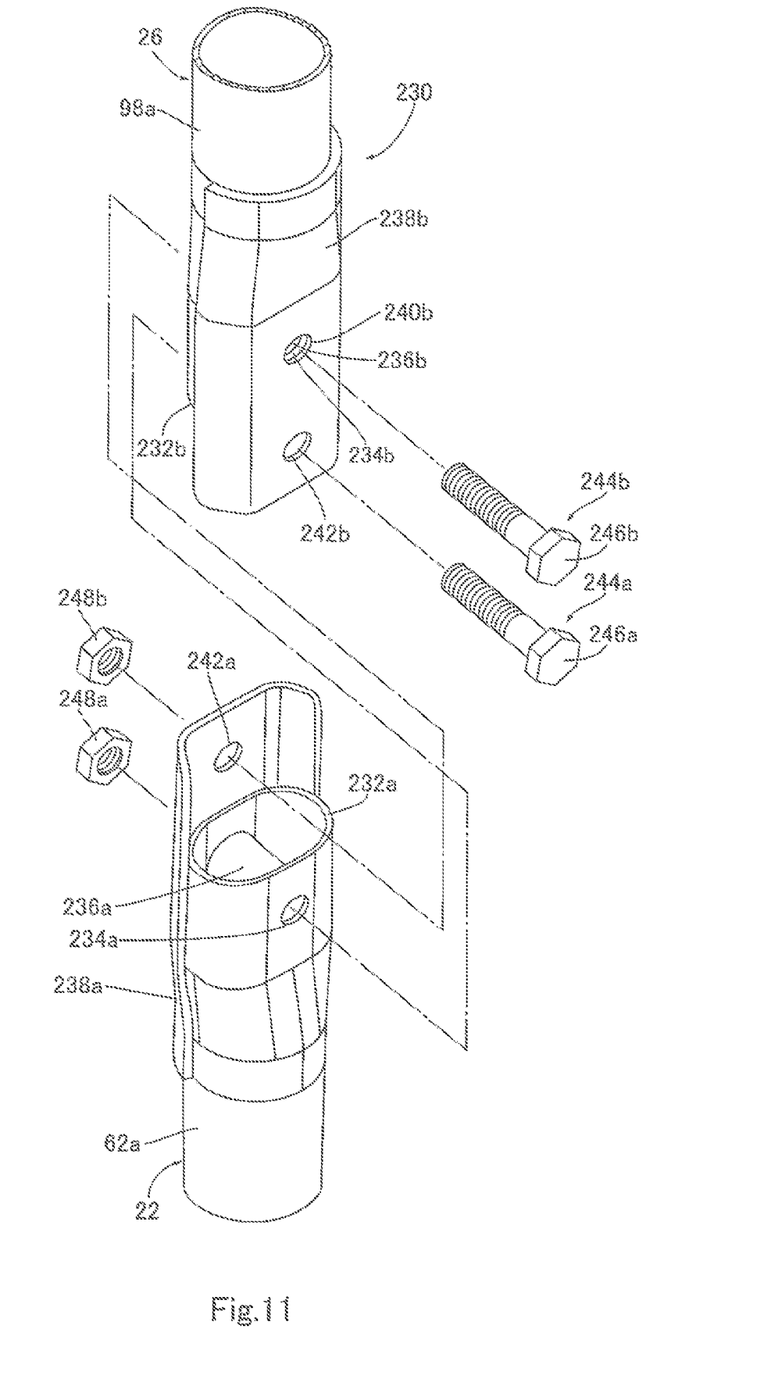
FIG. 11 is a perspective view showing a configuration of a coupling structure for coupling a main frame to a cabin frame (ROPS).
Figure 12:
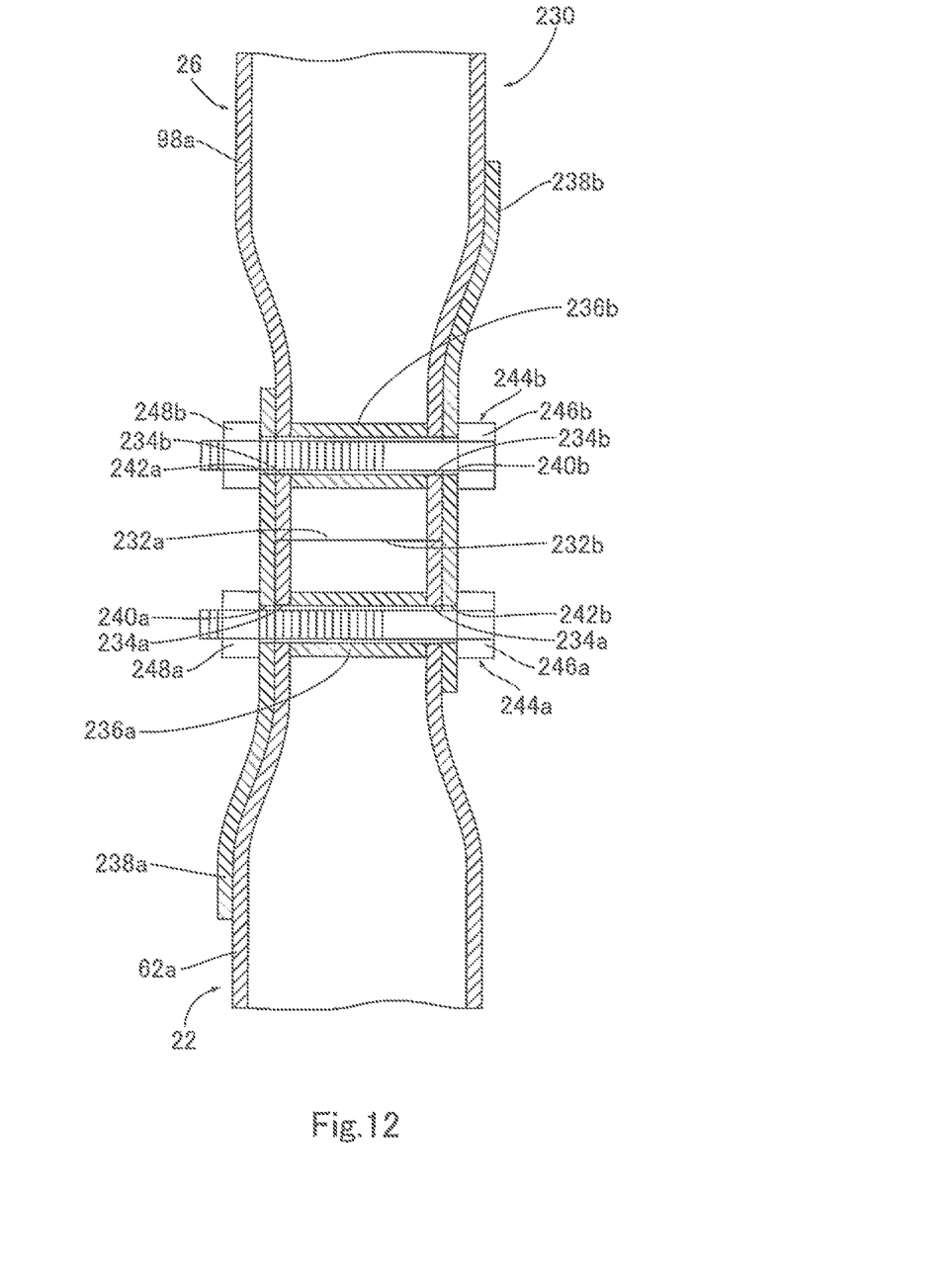
FIG. 12 is a longitudinal sectional view showing a configuration of the coupling structure for coupling the main frame to the cabin frame (ROPS).

FIG. 11 is a perspective view showing a configuration of the coupling structure 230 for coupling the main frame 22 to the cabin frame (ROPS) 26. FIG. 12 is a longitudinal sectional view showing a configuration of the coupling structure 230. The coupling structure 230 couples each of the lower pillar pipe elements 62a to 62c of the main frame 22 to the corresponding one of the upper pillar pipe elements 98a to 98c of the cabin frame (ROPS) 26. Hereinafter, for example, the coupling structure 230 for coupling the first lower pillar pipe element 62a to the first upper pillar pipe element 98a will be described.

As shown in FIGS. 11 and 12, the coupling structure 230 includes a first contact surface 232a formed at an end surface of the first lower pillar pipe element 62a and a second contact surface 232b, which is formed at an end surface of the first upper pillar pipe element 98a and contacts the first contact surface 232a. In this embodiment, each of an end portion of the first lower pillar pipe element 62a and an end portion of the first upper pillar pipe element 98a has a cross-section of an elongate-circle shape. Thus, the first contact surface 232a and the second contact surface 232b have an elongate-circle shape.

As shown in FIG. 12, a first hole 234a and a second hole 234b are formed at the end portion of the first lower pillar pipe element 62a and the end portion of the first upper pillar pipe element 98a, respectively, to extend along their short axes. A cylindrical first sleeve 236a and a cylindrical second sleeve 236b are disposed inside of the end portion of the first lower pillar pipe element 62a and inside the end portion of the first upper pillar pipe element 98a, respectively. The length of the first sleeve 236a is substantially equal to a short-axis inner diameter of the end portion of the first lower pillar pipe element 62a, and the length of the second sleeve 236b is substantially equal to a short-axis inner diameter of the end portion of the first upper pillar pipe element 98a.

As shown in FIGS. 11 and 12, the coupling structure 230 has a first sheet metal 238a and a second sheet metal 238b. The first sheet metal 238a is welded to a side surface of the end portion of the first lower pillar pipe element 62a, which has a side surface that is substantially parallel to a long axis of the first lower pillar pipe element 62a, such that a part of the first sheet metal 238a protrudes from the first contact surface 232a. The first sheet metal 238a extends between a portion of the side surface of the end portion of the first lower pillar pipe element 62a and a portion of the side surface of the end portion of the first upper pillar pipe element 98b. In contrast, the second sheet metal 238b is welded to a side surface of the end portion of the first upper pillar pipe element 98a, which has a side surface that is substantially parallel to a long axis of the first upper pillar pipe element 98a, such that a part of the second sheet metal 238b protrudes from the second contact surface 232b. The second sheet metal 238b extends between a portion of the side surface of the end portion of the first lower pillar pipe element 62a and a portion of the side surface of the end portion of the first upper pillar pipe element 98b, which has portions that are at an opposite side of the portions between which the first sheet metal 238a extends. A first hole 240a is formed at a portion of the first sheet metal 238a, which is welded to the end portion of the first lower pillar pipe element 62a so as to communicate with the first sleeve 236a, while a second hole 242a is formed at a portion of the first sheet metal 238a, which protrudes from the first contact surface 232a so as to communicate with the second sleeve 236b. In contrast, a second hole 240b is formed at a portion of the second sheet metal 238b, which is welded to the end portion of the second lower pillar pipe element 62b so as to communicate with the second sleeve 236b, while a first hole 242b is formed at a portion of the second sheet metal 238b, which protrudes from the second contact surface 232b so as to communicate with the first sleeve 236a.

As shown in FIGS. 11 and 12, the coupling structure 230 includes a first fastener member 244a and a second fastener member 244b. The first fastener member 244a is a member for fastening the end portion of the first lower pillar pipe element 62a, the first sheet metal 238a, and the second sheet metal 238b together, in a state where the first contact surface 232a is in contact with the second contact surface 232b. In this embodiment, the first fastener member 244a includes a first bolt 246a inserted into the first holes 242b, 234a, and 240a and the first sleeve 236a, and a first nut 248a threadingly engaged with the first bolt 246a. The second fastener member 244b is a member for fastening the end portion of the first upper pillar pipe element 98a, the second sheet metal 238b, and the first sheet metal 238a together, in a state where the first contact surface 232a is in contact with the second contact surface 232b. In this embodiment, the second fastener member 244b includes a second bolt 246b inserted into second holes 242a, 234b, and 240b and the second sleeve 236b, and a second nut 248b threadingly engaged with the second bolt 246b.

As shown in FIGS. 1 and 2, each of the seats S1 to S4 includes the seat frame 14, the seat bottom 16, and the seat backrest 18. In this embodiment, the seat frames 14 of the left seats S1 and S3 have substantially the same structure, while the seat frames 14 of the right seats S2 and S4 have substantially the same structure. The seat frame 14 of the left seat S1 and the seat frame 14 of the right seat S2 are substantially symmetric in the rightward and leftward direction, while the seat frame 14 of the left seat S3 and the seat frame 14 of the right seat S4 are substantially symmetric in the rightward and leftward direction. The seat bottoms 16 of the seats S1 to S4 have substantially the same structure and the seat backrests 18 of the seats S1 to S4 have substantially the same structure. Hereinafter, the seat frame 14, the seat bottom 16 and the seat backrest 18 of the seat S1 will be described, by way of example. The seats S2 and S3 will not be described specifically.

Figure 13:
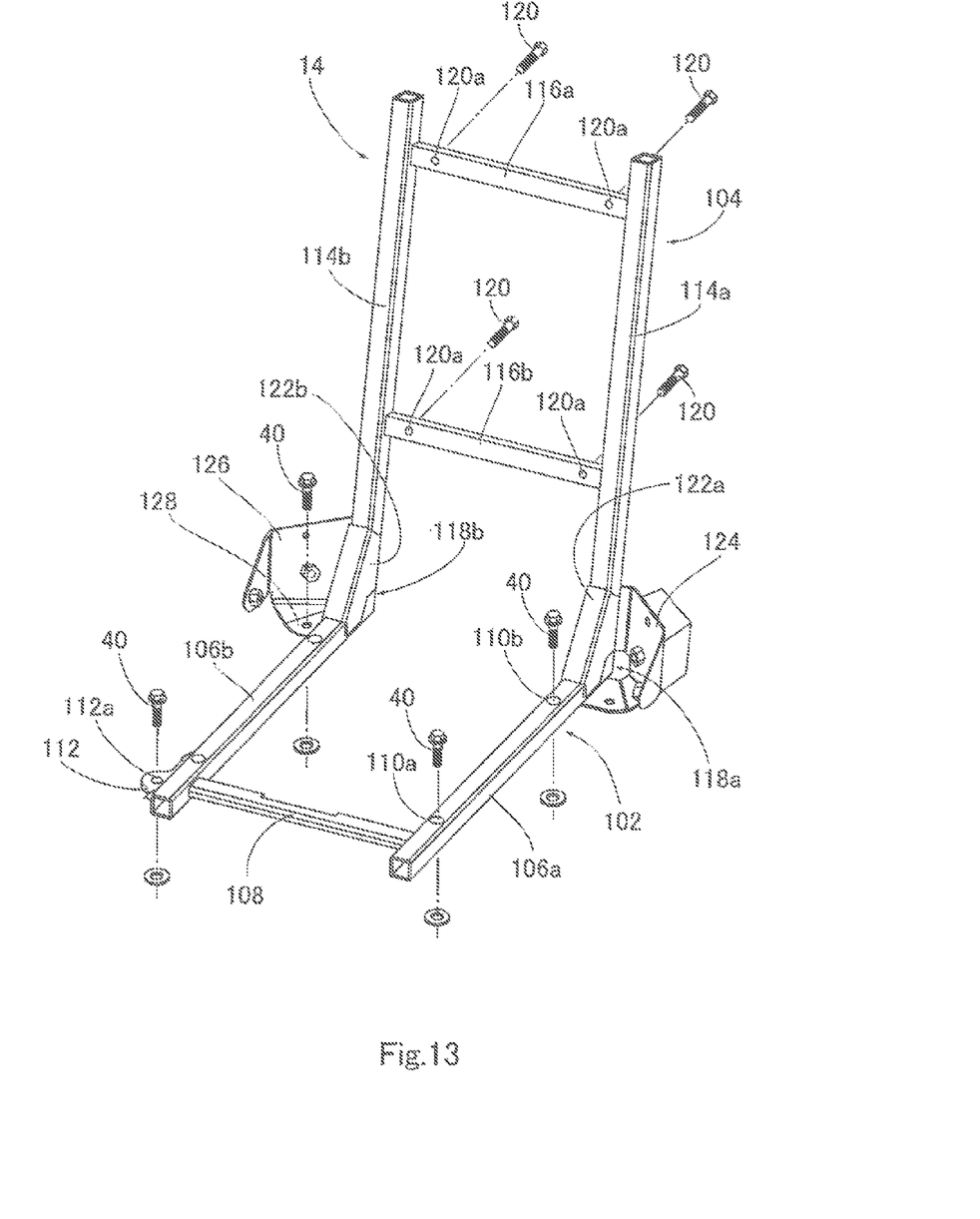
FIG. 13 is a perspective view showing a configuration of a seat frame.

FIG. 13 is a perspective view showing a configuration of the seat frame 14. The seat frame 14 includes a seat bottom support member 102 for supporting the seat bottom 16 (FIG. 2) and a seat backrest support member 104 for supporting the seat backrest 18 (FIG. 2).

As shown in FIG. 13, the seat bottom support member 102 includes two support pipes 106a and 106b arranged to extend in the forward and rearward direction in parallel with each other, and a coupling pipe 108 for coupling the two support pipes 106a and 106b to each other. The support pipes 106a and 106b are rectangular pipes having rectangular cross-sections. As shown in FIG. 3, the support pipes 106a and 106b are designed to have a length greater than a distance between the support pipe 38 of the main frame 22 and the cross member 80 of the sub-frame 24. As shown in FIG. 13, the support pipe 106a is provided with holes 110a and 110b, which are spaced apart from each other in the forward and rearward directions. Bolts 40 are inserted into the holes 110a and 110b, respectively. A plate 112 having a hole 112a into which the bolt 40 is inserted is provided on an outer side surface of a front end portion of the support pipe 106b. The coupling pipe 108 is a rectangular pipe having a rectangular cross-section. One end portion of the coupling pipe 108 is welded to a front end portion of the support pipe 106a, while an opposite end portion thereof is welded to a front end portion of the support pipe 106b.

As shown in FIG. 13, the seat backrest support member 104 includes two support pipes 114a and 114b arranged to extend vertically in parallel with each other, and two coupling pipes 116a and 116b for coupling the two support pipes 114a and 114b to each other. The support pipes 114a and 114b are rectangular pipes having rectangular cross-sections. The support pipe 114a is connected to the support pipe 106a of the seat bottom support member 102 via a bent portion 118a, while the support pipe 114b is connected to the support pipe 106b of the seat bottom support member 102 via a bent portion 118b. Each of the two coupling pipes 116a and 116b is a rectangular pipe having a rectangular cross-section. One end portion of each of the coupling pipes 116a and 116b is welded to the support pipe 114a, while an opposite end portion of each of the two coupling pipes 116a and 116b is welded to the support pipe 114b. Each of the coupling pipes 116a and 116b has holes 120a into which bolts 120 are inserted, respectively.

As shown in FIG. 13, at the bent portion 118a or in the vicinity of the bent portion 118a, a metal-made reinforcement plate 122a for reinforcing the bent portion 118a and a seat belt accommodating portion 124 for accommodating a seat belt (not shown) are provided between and coupled to the support pipe 106a of the seat bottom support member 102 and the support pipe 114a of the seat backrest support member 104. In this embodiment, the seat belt accommodating portion 124 is a retractor which winds back the seat belt. At the bent portion 118b or in the vicinity of the bent portion 118b, a metal-made reinforcement plate 122b for reinforcing the bent portion 118b and a seat belt fastening portion 126 for fastening the seat belt are provided between and coupled to the support pipe 106b of the seat bottom support member 102 and the support pipe 114b of the seat backrest support member 104. The reinforcement plate 122b has a hole 128 into which the bolt 40 is inserted.

As shown in FIG. 3, when the seat frame 14 is mounted to the vehicle body frame 12, the front portions of the two support pipes 106a and 106b are placed on the support pipes 38 of the main frame 22, and their rear end portions are placed on the cross member 80 of the sub-frame 24. Then, as shown in FIG. 13, the four bolts 40 are inserted into the holes 110a, 110b, 112a and 128 of the seat frame 14 and into the holes 42a, 88a, 42a and 88a (FIG. 6) of the vehicle body frame 12

(FIG. 3), and the seat frame 14 is fastened to the vehicle body frame 12 (FIG. 3) using these bolts 40.

As shown in FIG. 3, the seat bottom 16 supports a hip part of the passenger. An upper surface of the seat bottom 16 has a shape in which both side portions in the rightward and leftward direction are higher than a center portion in the rightward and leftward direction to allow the passenger to be easily seated thereon. Two second engagement mechanisms 142 are provided on a rear portion of the lower surface 16a of the seat bottom 16 such that they are spaced apart from each other in the rightward and leftward direction. The second engagement mechanisms 142 are engaged with the cross member 80 from below. In addition, a first engagement mechanism 144 is provided on a front portion of the lower surface 16a of the seat bottom 16 and is engaged with the coupling pipe 108 (FIG. 13) of the seat frame 14 from below. When the seat bottom 16 is mounted to the seat frame 14, the second engagement mechanisms 142 are brought into contact with the cross member 80 from forward, and are engaged with the cross member 80. The first engagement mechanism 144 is engaged with the coupling pipe 108 (FIG. 13).

As shown in FIG. 3, the seat backrest 18 supports a back of the passenger. The seat backrest 18 is provided on a back surface thereof with threaded holes (not shown) into which bolts 120 (FIG. 13) are threadingly engaged. When the seat backrest 18 is mounted to the seat frame 14, the support pipes 114a and 114b and the coupling pipes 116a and 116b of the seat frame 14 (FIG. 13) are brought into contact with the back surface of the seat backrest 18. Then, the bolts 120 are inserted into the plurality of holes 120a provided in the coupling pipes 116a and 116b (FIG. 7) and are threaded into the threaded holes (not shown) of the seat backrest 18.

As shown in FIG. 4, in this embodiment, since the floor member 28 is constructed of the rectangular pipes 36, it is possible to effectively prevent the floor member 28 from being deformed due to a load of the engine E, external load, etc. In addition, since the side member 30 is constructed of round pipes, which are easily bent in all directions, external design appearance of the side member 30 can be improved. This improves external design appearance of the utility vehicle 10 in a state where the cabin frame (ROPS) 26 is detached.

As shown in FIGS. 11 and 12, in this embodiment, since the coupling structure 230 has a simple structure, a weight of the coupling structure 230 can be reduced and the coupling structure 230 can be manufactured inexpensively. In the coupling structure 230, in addition, the first sleeve 236a can reinforce the end portion of the first lower pillar pipe element 62a, and the second sleeve 236b can reinforce the end portion of the first upper pillar pipe element 98a. Therefore, the first fastener member 244a and the second fastener member 244b can be tightened with a great force without deforming the first lower pillar pipe element 62a and the first upper pillar pipe element 98a to enable the first lower pillar pipe element 62a to be firmly coupled to the first upper pillar pipe element 98a. Furthermore, since the first sheet metal 238a and the second sheet metal 238b are welded to the side surface of the end portion of the first lower pillar pipe element 62a and to the side surface of the end portion of the first upper pillar pipe element 98a, which has surfaces that are substantially parallel to their long axes, a size of the coupling structure 230 in a direction substantially perpendicular to their long axes does not increase.

Although the four seats S1 to S4 are arranged at the front and rear sides and at the right and left sides in the above embodiment, as shown in FIG. 1, the number and arrangement of the seats may be suitably changed as desired. For example, only the seats S1 and S2 may be arranged at the right and left sides, or otherwise only the seats S1 and S3 may be arranged at the front and rear sides in a two-seated utility vehicle.

Although in this embodiment, each of the end portion of the first lower pillar pipe element 62a and the end portion of the first upper pillar pipe element 98a in the coupling structure 230 (FIG. 11, FIG. 12) has a cross-section of an elongate-circle shape, the end portion may have other shape such as a circular shape or a rectangular shape. If these end portions have stiffness so that they are not easily deformed, the first sleeve 236a and the second sleeve 236b may be omitted.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
a vehicle body frame including a main frame to which an engine is mounted;
wherein the main frame includes a round pipe having a circular cross-section and a rectangular pipe having a rectangular cross-section;
wherein the main frame includes a floor member which receives a load of the engine and a pair of right and left side members provided integrally with both side portions of the floor member in a rightward and leftward direction;
wherein the floor member includes a rectangular pipe and the side members include round pipes;
wherein the side members include side pipe elements provided at the side portions of the floor member in the rightward and leftward direction, respectively, to extend in a forward and rearward direction, and lower pillar pipe elements provided to extend upward from rear end portions of the side pipe elements, respectively; and
a portion of each of the respective side pipe elements is tilted such that its height increases from a lowest point at a front end of the respective side pipe element toward a rear end of the respective side pipe element adjacent a corresponding one of the lower pillar pipe elements.

2. The utility vehicle according to claim 1, wherein a portion of each of the respective side pipe elements is tilted with respect to a horizontal plane such that its height increases from a lowest point at a front end of the respective side pipe element toward a rear end of the respective side pipe element adjacent a corresponding one of the lower pillar pipe elements.

3. A utility vehicle comprising:
a vehicle body frame including a main frame to which an engine is mounted;
wherein the main frame includes a round pipe having a circular cross-section and a rectangular pipe having a rectangular cross-section;
wherein the main frame includes a floor member which receives a load of the engine and a pair of right and left side members provided integrally with both side portions of the floor member in a rightward and leftward direction;
wherein the floor member includes a rectangular pipe and the side members include round pipes;
wherein the pair of right and left side members respectively include side pipe elements coupled to the side portions of the floor member in the rightward and leftward direction and a plurality of lower pillar pipe elements extending upward from the side pipe elements; and wherein the plurality of lower pillar pipe elements are constructed of round pipes;

the utility vehicle further comprising:
- a cabin frame including a plurality of upper pillar pipe elements constructed of round pipe, the cabin frame being provided to cover a cabin in which a passenger's seat is disposed; and
- a coupling structure for coupling each of the lower pillar pipe elements of the main frame to a respective one of the upper pillar pipe elements of the cabin frame;

wherein, for each coupling between one of the lower pillar pipe elements and the corresponding upper pillar pipe element, the coupling structure has:
- a first contact surface formed at an end surface of the lower pillar pipe element;
- a second contact surface which is formed at an end surface of the upper pillar pipe element and contacts the first contact surface;
- a first sheet metal provided to extend between a portion of a side surface of an end portion of the lower pillar pipe element and a portion of a side surface of an end portion of the upper pillar pipe element;
- a second sheet metal provided to extend between a portion of the side surface of the end portion of the lower pillar pipe element and a portion of the side surface of the end portion of the upper pillar pipe element, which portions are at an opposite side of the portion of the side surface and the portion of the side surface between which the first sheet metal extends;
- a first fastener member for coupling the end portion of the lower pillar pipe element, the first sheet metal, and the second sheet metal together in a state where the first contact surface is in contact with the second contact surface; and
- a second fastener member for coupling the end portion of the upper pillar pipe element, the first sheet metal and the second sheet metal together in a state where the first contact surface is in contact with the second contact surface;

wherein the first sheet metal is welded to the end portion of the lower pillar pipe element such that a portion of the first sheet metal protrudes from the first contact surface, and the second sheet metal is welded to the end portion of the upper pillar pipe element such that a portion of the second sheet metal protrudes from the second contact surface.

4. The utility vehicle according to claim 3, wherein for each respective lower pillar pipe element and corresponding upper pillar pipe element, corresponding first fastener member, and corresponding second fastener member:
- the end portion of the lower pillar pipe element, the first sheet metal and the second sheet metal respectively have first holes communicating with each other;
- the end portion of the upper pillar pipe element, the first sheet metal and the second sheet metal respectively have second holes communicating with each other;
- a tubular first sleeve is disposed inside the end portion of the lower pillar pipe element such that the tubular first sleeve communicates with each of the first holes;
- a tubular second sleeve is disposed inside the end portion of the upper pillar pipe element such that the tubular second sleeve communicates with each of the second holes;
- the first fastener member includes a first bolt inserted into each of the first holes and the first sleeve, and a first nut threadingly engageable with the first bolt; and
- the second fastener member includes a second bolt inserted into each of the second holes and the second sleeve, and a second nut threadingly engageable with the second bolt.

5. The utility vehicle according to claim 4, wherein for each respective lower pillar pipe element and corresponding upper pillar pipe element, corresponding first sheet metal, and corresponding second sheet metal:
- the end portion of the lower pillar pipe element has a cross-section of an elongate circle shape;
- the end portion of the upper pillar pipe element has a cross-section of an elongate circle shape;
- the first sheet metal is welded to a side surface of the end portion of the lower pillar pipe element, the side surface being substantially parallel to a long axis of the lower pillar pipe element; and
- the second sheet metal is welded to a side surface of the end portion of the upper pillar pipe element, the side surface being substantially parallel to a long axis of the upper pillar pipe element.

\* \* \* \* \*